United States Patent
Santhar et al.

(10) Patent No.: US 11,284,293 B2
(45) Date of Patent: Mar. 22, 2022

(54) LOCATION-BASED TELECOMMUNICATION PRIORITIZATION

(71) Applicant: International Business Machines Corporation, Armonk, NY (US)

(72) Inventors: Sathya Santhar, Chennai (IN); Sarbajit K. Rakshit, Kolkata (IN); Balamurugaramanathan Sivaramalingam, Paramakudi (IN); Samuel Mathew Jawaharlal, Chennai (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/785,876

(22) Filed: Feb. 10, 2020

(65) Prior Publication Data
US 2021/0250806 A1 Aug. 12, 2021

(51) Int. Cl.
*H04W 28/02* (2009.01)

(52) U.S. Cl.
CPC ... *H04W 28/0289* (2013.01); *H04W 28/0226* (2013.01)

(58) Field of Classification Search
CPC ......... H04W 28/0289; H04W 28/0226; H04W 76/50; H04W 84/18; H04W 4/90; H04M 1/72421; H04M 3/523; H04M 3/5116; H04M 3/5232; H04M 2242/04
See application file for complete search history.

(56) References Cited

U.S. PATENT DOCUMENTS

| 2006/0178128 A1* | 8/2006 | Eaton | H04W 76/50 455/404.1 |
| 2007/0243874 A1* | 10/2007 | Park | H04W 72/082 455/442 |
| 2011/0096665 A1 | 4/2011 | McCann et al. | |
| 2011/0250846 A1* | 10/2011 | Shu | H04W 72/06 455/67.7 |
| 2014/0051379 A1 | 2/2014 | Ganesh et al. | |
| 2014/0287713 A1* | 9/2014 | Kijiya | H04W 4/90 455/404.2 |

(Continued)

OTHER PUBLICATIONS

Eguchi et al., "The Application of Remote Sensing Technologies for Disaster Management", The 14th World Conference on Earthquake Engineering, Oct. 12-17, 2008, 17 pages <https://www.iitk.ac.in/nicee/wcee/article/14_K004.pdf>.

(Continued)

*Primary Examiner* — Ian N Moore
*Assistant Examiner* — Sun Jong Kim
(74) *Attorney, Agent, or Firm* — Jamar K. Ray

(57) ABSTRACT

A method can include obtaining telecommunication data corresponding to a first cell site. The first cell site can have a communication capacity within a first coverage region. The first coverage region can include a set of subregions. The method can further include obtaining condition data corresponding to a set of focus areas within the first coverage region. The set of focus areas can have at least one emergency condition. The method can further include generating, based on the telecommunication data and the condition data, a first respective classification for each of the subregions.

18 Claims, 10 Drawing Sheets

(56) References Cited

U.S. PATENT DOCUMENTS

| | | | |
|---|---|---|---|
| 2015/0365954 A1* | 12/2015 | Levine | H04W 72/06 455/450 |
| 2018/0288224 A1 | 10/2018 | Dizengof et al. | |
| 2018/0308031 A1 | 10/2018 | Yan et al. | |
| 2021/0152584 A1* | 5/2021 | Chakravarty | H04L 63/1425 |

OTHER PUBLICATIONS

Nguyen et al., "Damage Assessment from Social Media Imagery Data During Disasters", 2017 IEEE/ACM International Conference on Advances in Social Networks Analysis and Mining, Jul. 31-Aug. 3, 2017, 8 pages <https://mimran.me/papers/Damage_assessment_from_Social_Media_Images.pdf>.

Mell et al., "The NIST Definition of Cloud Computing", Recommendations of the National Institute of Standards and Technology, Sep. 2011, 7 pages.

* cited by examiner

LOCATION-BASED TELECOMMUNICATION PRIORITIZATION

BACKGROUND

The present disclosure relates to telecommunication management, and more specifically to location-based telecommunication prioritization.

Telecommunication networks can include cell sites that can permit communication devices within a coverage region to access the telecommunication networks. Each cell site can have a communication capacity that determines a number of communication devices that the cell site can permit to access a telecommunication network. A cell site can permit such access on a first-come, first-served basis.

SUMMARY

According to embodiments of the present disclosure, a method can include obtaining telecommunication data corresponding to a first cell site. The first cell site can have a communication capacity within a first coverage region. The first coverage region can include a set of subregions. The method can further include obtaining condition data corresponding to a set of focus areas within the first coverage region. The set of focus areas can have at least one emergency condition. The method can further include generating, based on the telecommunication data and the condition data, a first respective classification for each of the subregions.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
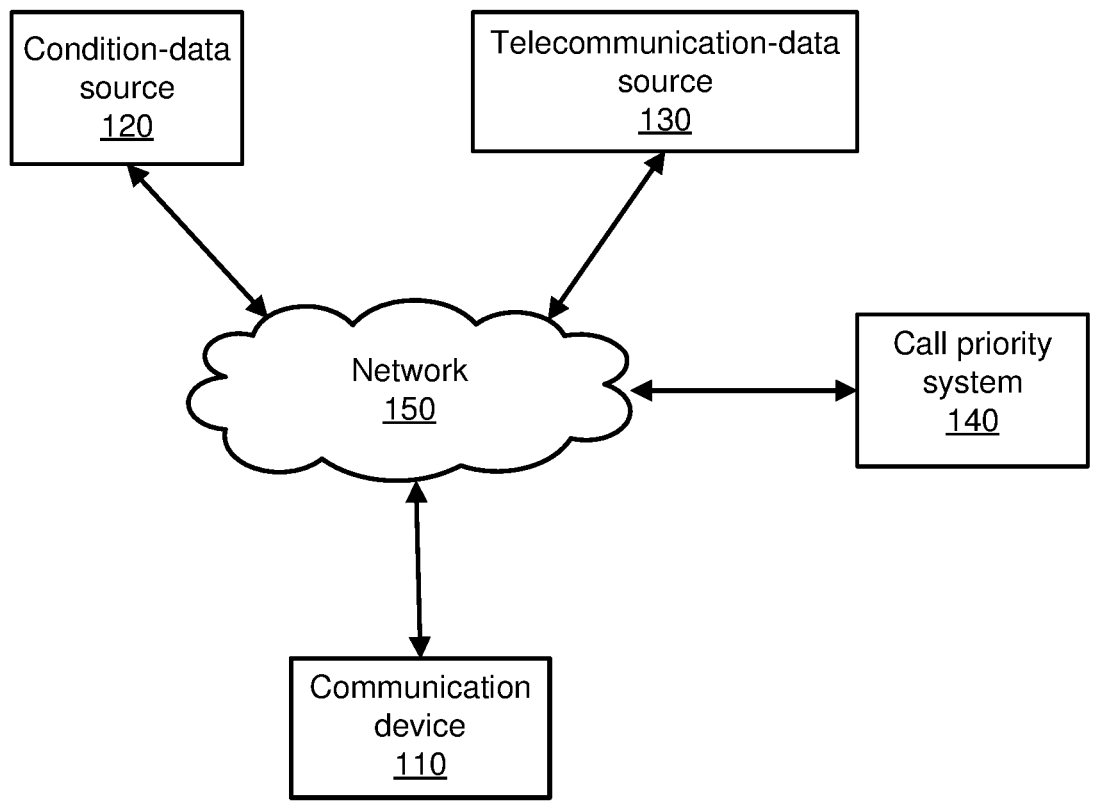
FIG. 1 depicts an example computing environment having a call priority system, in accordance with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to telecommunication management; more particular aspects relate to location-based telecommunication prioritization. While the present disclosure is not necessarily limited to such applications, various aspects of the disclosure may be appreciated through a discussion of various examples using this context.

Telecommunication networks can include cell sites that can permit communication devices within a coverage region to access the telecommunication networks. Each cell site can have a communication capacity that determines a number of communication devices that the cell site can permit to access a telecommunication network. A cell site can permit such access on a first-come, first-served basis. However, in the event of an emergency, such as an earthquake or flood, permitting access to a telecommunication network on a first-come, first served basis can present a number of challenges. For example, during such emergencies, a significantly increased number of communication device users within a coverage region can attempt to access the telecommunication network. As a result, the communication capacity of a cell site in the coverage region can be exceeded; thus, communication device users in need of assistance can be unable to communicate with entities, such as the police or the fire department, to obtain such assistance.

To address these and other challenges, embodiments of the present disclosure include a call priority system that can generate a set of classifications that can indicate a prioritized allocation of a cell site's communication capacity. The set of classifications can be based on telecommunication data and condition data regarding emergency conditions. Additionally, the set of classifications can correspond, respectively, to a set of subregions of a cell site's coverage region.

Accordingly, embodiments of the present disclosure can dynamically determine subregions for which a cell site's communication capacity should be modified based on one or more emergency conditions. Such modifications can increase communication capacity to communication device users in subregions where circumstances may be more dangerous and decrease communication capacity in subregions where circumstances may be less dangerous. Thus, embodiments of the present disclosure can facilitate efficient and accurate administration of assistance to communication device users subject to emergency conditions.

Turning to the figures, FIG. 1 illustrates a computing environment 100 that includes one or more of each of a communication device 110, a condition-data source 120, a telecommunication-data source 130, a call priority system 140, and a network 150. The call priority system 140 can be identical or substantially similar to the call priority system 240 discussed with respect to FIG. 2. The call priority system 140 can include a computer system, such as the computer system 801 discussed with respect to FIG. 8.

Referring back to FIG. 1, in some embodiments, the call priority system 140 can be a standalone device that communicates with one or more of a communication device 110, a condition-data source 120, and a telecommunication-data source 130, through a network 150. In some embodiments, the call priority system 140 can be integrated into a computer system of one or more of the network 150 and the telecommunication-data source 130. In some embodiments, the call priority system 140 can determine whether a user device 110 can access a telecommunications network based on data the call priority system 140 obtains from one or more of a communication device 110, a condition-data source 120, and a telecommunication-data source 130.

In some embodiments, the network 150 can include a telecommunications network, such as a cellular network having a set of cell sites. A cell site can include a set of equipment (e.g., transmitters, signal processors, and/or receivers) for receiving and transmitting signals for mobile voice and data communication. In some embodiments, the network 150 can include a wide area network (WAN), a local area network (LAN), the Internet, or an intranet. In some embodiments, the network 150 can be substantially similar to, or the same as, cloud computing environment 50 discussed with respect to FIG. 9.

In some embodiments, communication device 110 can include one or more of a mobile phone, tablet computer, laptop computer, smart watch, and the like. In some embodiments, the condition-data source 120 can include one or more web-servers and/or image-capture devices, such as cameras mounted to unmanned aerial vehicles (UAV's). In some embodiments, a condition-data source can include a website that provides news and/or weather information. In some embodiments, a condition-data source can include a website that displays social media posts, such as text and/or images. In some embodiments, the telecommunication-data source 130 can include at least one of a web-server and a computer system of a cell site.

Figure 2:
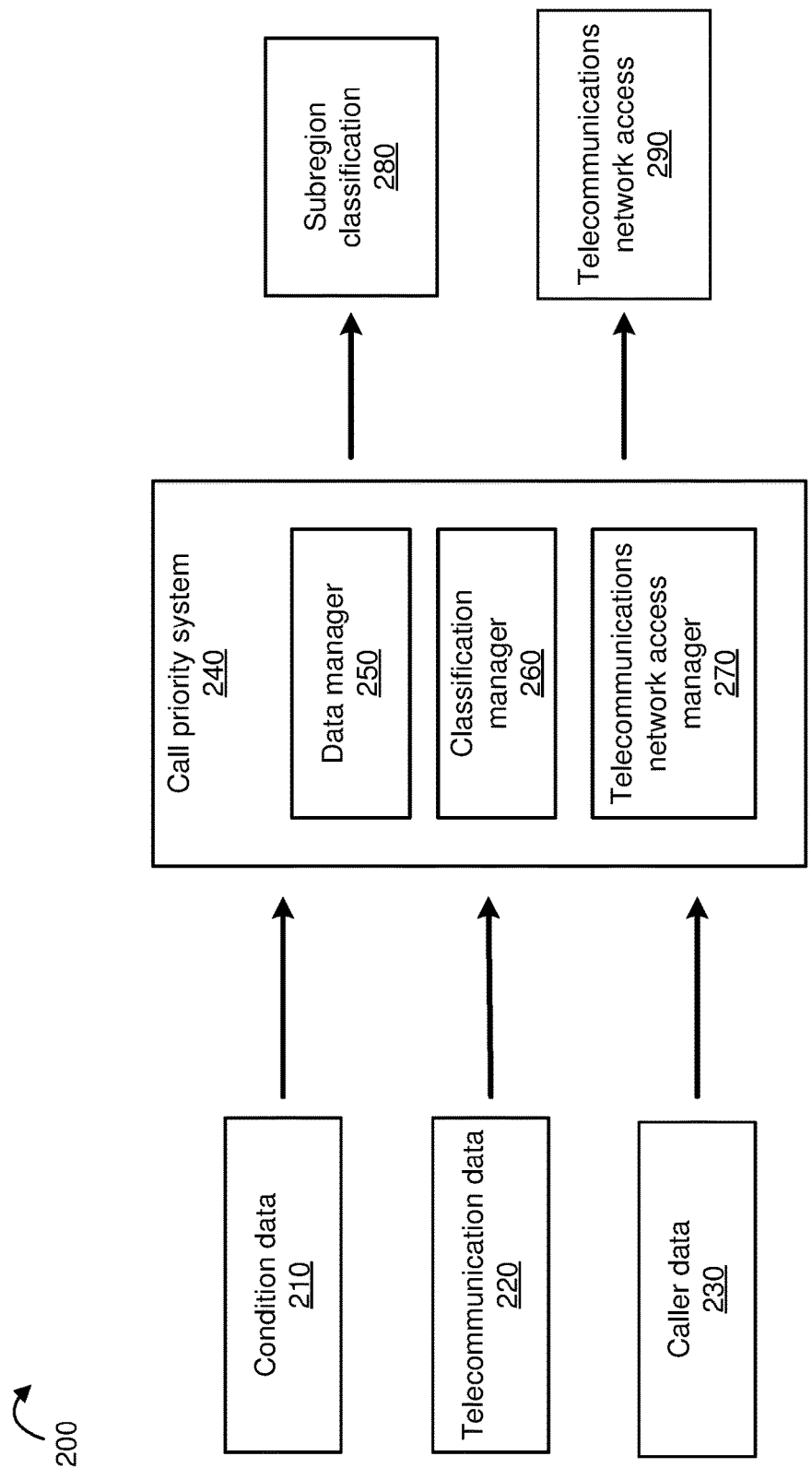
FIG. 2 depicts a system block diagram of a call priority system, in accordance with embodiments of the present disclosure.

FIG. 2 depicts a system block diagram 200 of a call priority system 240, in accordance with embodiments of the present disclosure. Call priority system 240 can be identical or substantially similar to call priority system 140 discussed with respect to FIG. 1. In some embodiments, call priority system 240 can include a computer system, such as the computer system 801 discussed with respect to FIG. 8, that can implement, by at least one processor, one or more operations, such as those discussed with respect to FIGS. 3-5.

Referring back to FIG. 2, in some embodiments, call priority system 240 can generate one or more subregion classifications 280 and/or determine telecommunications network access 290 (e.g., whether a communication device can use a cell site to access a telecommunications network) based on condition data 210, telecommunication data 220, and/or caller data 230. Call priority system 240 can obtain condition data 210, telecommunication data 220, and/or caller data 230 from one or more sources, such as communication device 110, condition-data source 120, telecommunication data source 130, and/or network 150 described with respect to FIG. 1. In some embodiments, call priority system 240 can transmit subregion classifications 280 to an entity, such as a mobile phone service provider or a government agency, to facilitate management of a telecommunications network. In these embodiments, the entity can determine telecommunications network access 290.

Condition data 210 can include structured and unstructured data related to one or more emergency conditions in a geographic area. Emergency conditions can include circumstances that can present a risk of injury or death to a plurality of people. For example, condition data 210 can include text and/or images containing information about an emergency condition such as flooding, a fire, an earthquake, a mass transportation accident, and the like. In some embodiments, condition data 210 can include information such as an extent of damage (e.g., a level of floodwater, a number of collapsed buildings, and the like). In some embodiments, condition data 210 can include information such as a geographic location of an emergency condition and quantity of people in a geographic area where an emergency condition exists.

Telecommunication data 220 can include information such as a location and a communication capacity of one or more cell sites. In some embodiments, a communication capacity can refer to a maximum quantity of communication devices that a cell site can permit to access a telecommunications network.

Caller data 230 can include information such as a location of a communication device and a location of a communication device user. In some embodiments, caller data 230 can include a call order (e.g., an order of an attempt by a communication device to access a telecommunications network among a queue of attempts by a plurality of communication devices to access the telecommunications network). In some embodiments, caller data 230 can include historical data, such as a number of times a communication device has been permitted access to a telecommunications network using one or more cell sites.

In some embodiments, call priority system 240 can include a discrete data manager 250, classification manager 260, and/or a telecommunications network access manager 270. In some embodiments, the data manager 250, classification manager 260, and/or telecommunications network access manager 270 can be integrated into a single device, such as a processor of the call priority system 240. The data manager 250 can be configured to analyze the condition data 210, telecommunication data 220, and/or caller data 230. For example, the data manager 250 can include image analysis technology to identify and count a number of people appearing in an image obtained by the call priority system 240. In another example, the data manager 250 can implement natural language processing technology to interpret social media posts and/or news publications.

Figure 4:
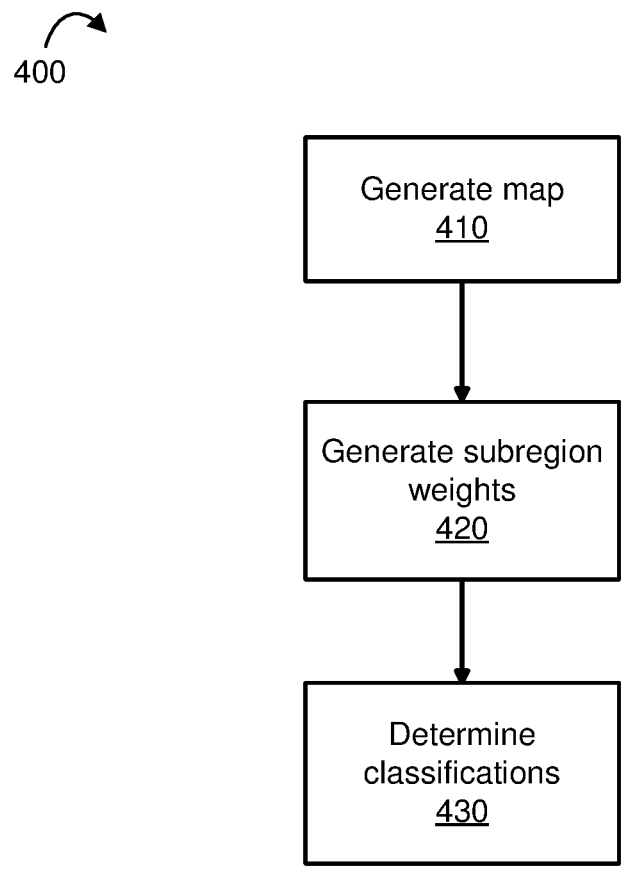
FIG. 4 depicts a flowchart of an example method for generating subregion classifications, in accordance with embodiments of the present disclosure.

The classification manager 260 can be configured to generate a set of subregion classifications, such as by method 400 described with respect to FIG. 4. In embodiments in which call priority system 240 includes a telecommunications network access manager 270, the telecommunications network access manager can determine whether to permit access to a telecommunications network, such as by method 500 described with respect to FIG. 5.

Figure 3:
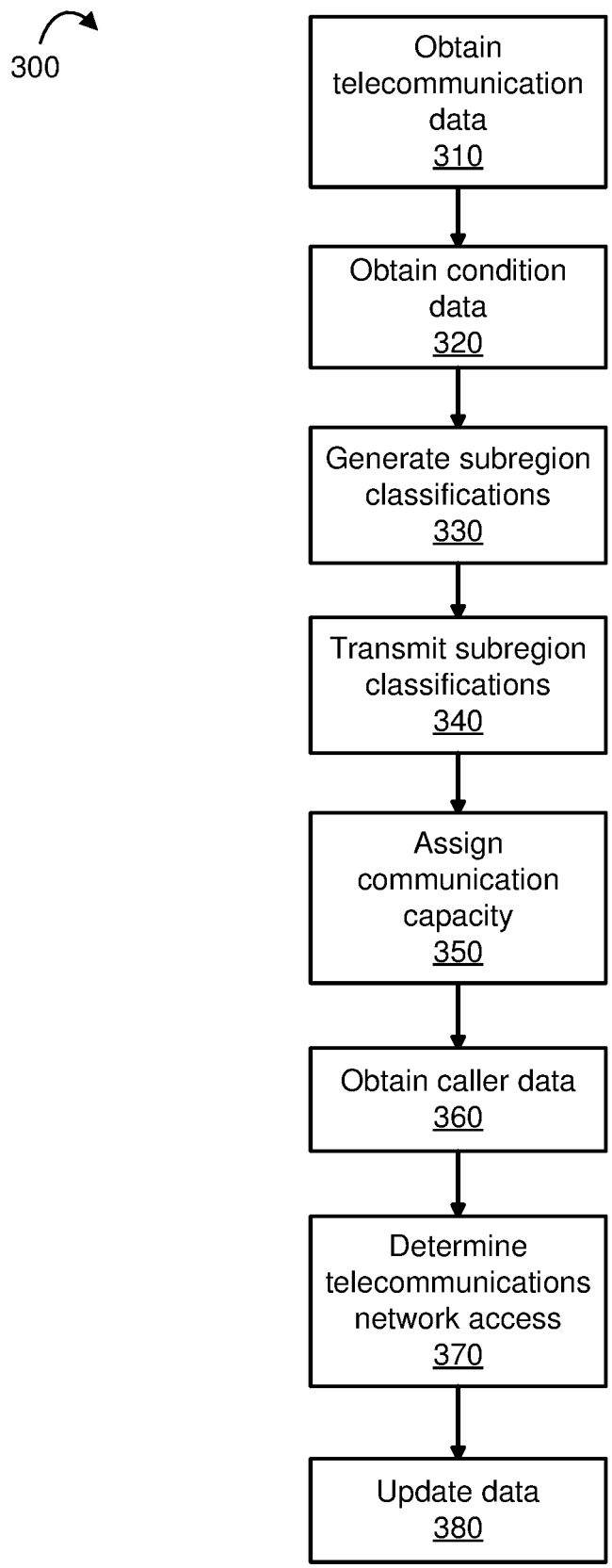
FIG. 3 depicts a flowchart of an example method for performing location-based prioritization, in accordance with embodiments of the present disclosure.

FIG. 3 depicts a flowchart of an example method 300 for performing location-based prioritization, in accordance with embodiments of the present disclosure. Method 300 can be performed by a processor of a call priority system, such as call priority system 240 discussed with respect to FIG. 2.

Referring back to FIG. 3, in operation 310, the call priority system obtains telecommunication data from a telecommunication-data source, such as telecommunication-data source 130 discussed with respect to FIG. 1.

In operation 320, the call priority system obtains condition data from a condition-data source, such as condition-data source 120 discussed with respect to FIG. 1.

In operation 330, the call priority system generates subregion classifications. A subregion classification can indicate a portion of a cell site's communication capacity that can be assigned to a subregion of the cell site's coverage region. In some embodiments, a subregion classification can be a numerical value that corresponds to a percentage of a cell site's communication capacity to be assigned to a subregion. For example, subregion classifications 1, 2, 3, 4, and 5, can correspond, respectively, to 20%, 40%, 60%, 80%, and 100% of a cell site's communication capacity to be assigned to a subregion. In some embodiments, the call priority system can generate subregion classifications according to method 400 described with respect to FIG. 4.

In some embodiments, in operation 340, the call priority system can transmit the subregion classifications generated in operation 330 to an entity, such as a mobile phone service provider or a government agency. In some embodiments, the entity can assign portions of a cell site's communication capacity based on the transmitted subregion classifications. In these embodiments, the call priority system can proceed to operation 370.

In operation 350, the call priority system can assign, based on the subregion classifications generated in operation 330, a portion of a cell site's communication capacity to one or more subregions of the cell site's coverage region. In some embodiments, assigning a portion of a cell site's communication capacity can include allocating the cell site's communication capacity among subregions.

For example, in some embodiments, a cell site can have a coverage region comprising 4 subregions. Continuing with this example, based on subregion classifications, the call priority system can assign 10% of the cell site's communication capacity to a first subregion, 50% of the cell site's communication capacity to a second subregion, 20% of the cell site's communication capacity to a third subregion, and 20% of the cell site's communication capacity to a fourth subregion. Thus, in this example, if the cell site had a communication capacity of 100 communication devices, up to 10 communication devices from the first subregion would be permitted to access a telecommunications network using the cell site; up to 50 communication devices from the second subregion would be permitted to access a telecommunications network using the cell site; and so on. In this example, the classifications and assignments can be based on an extent of an emergency condition in each subregion. Further in this example, the call priority system can have determined that communication device users in the second subregion likely need greater access to a telecommunications network to obtain assistance.

In some embodiments, in operation 360, the call priority system can obtain caller data from a communication device and/or a telecommunication-data source, such as communication device 110 and/or telecommunication-data source 130 discussed with respect to FIG. 1.

In some embodiments, in operation 370, the call priority system can determine telecommunications network access, such as whether a communication device is permitted to use a cell site to access a telecommunications network. In some embodiments, the call priority system can make such a determination according to method 500, discussed with respect to FIG. 5.

In operation 380, the call priority system can update one or more of the condition data, telecommunication data, and caller data and repeat method 300. In this way, the call priority system can dynamically generate subregion classifications and accurately determine a need for telecommunications network access in each subregion.

FIG. 4 depicts a flowchart of an example method 400 for generating subregion classifications, in accordance with embodiments of the present disclosure. Method 400 can be performed by a processor of a call priority system, such as call priority system 240 discussed with respect to FIG. 2.

Figure 6:
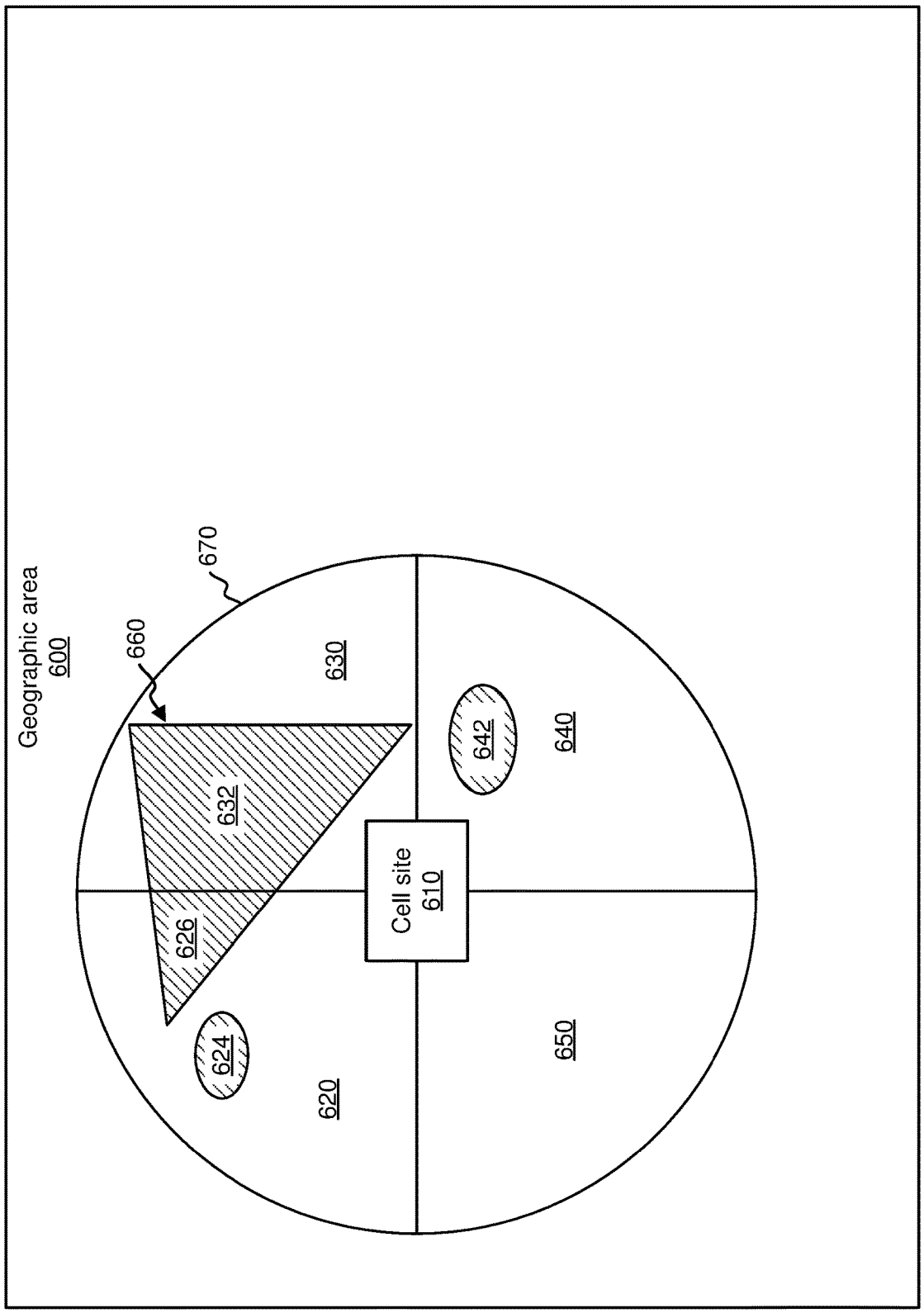
FIG. 6 depicts an example geographic area having a cell site, in accordance with embodiments of the present disclosure.
Figure 7:
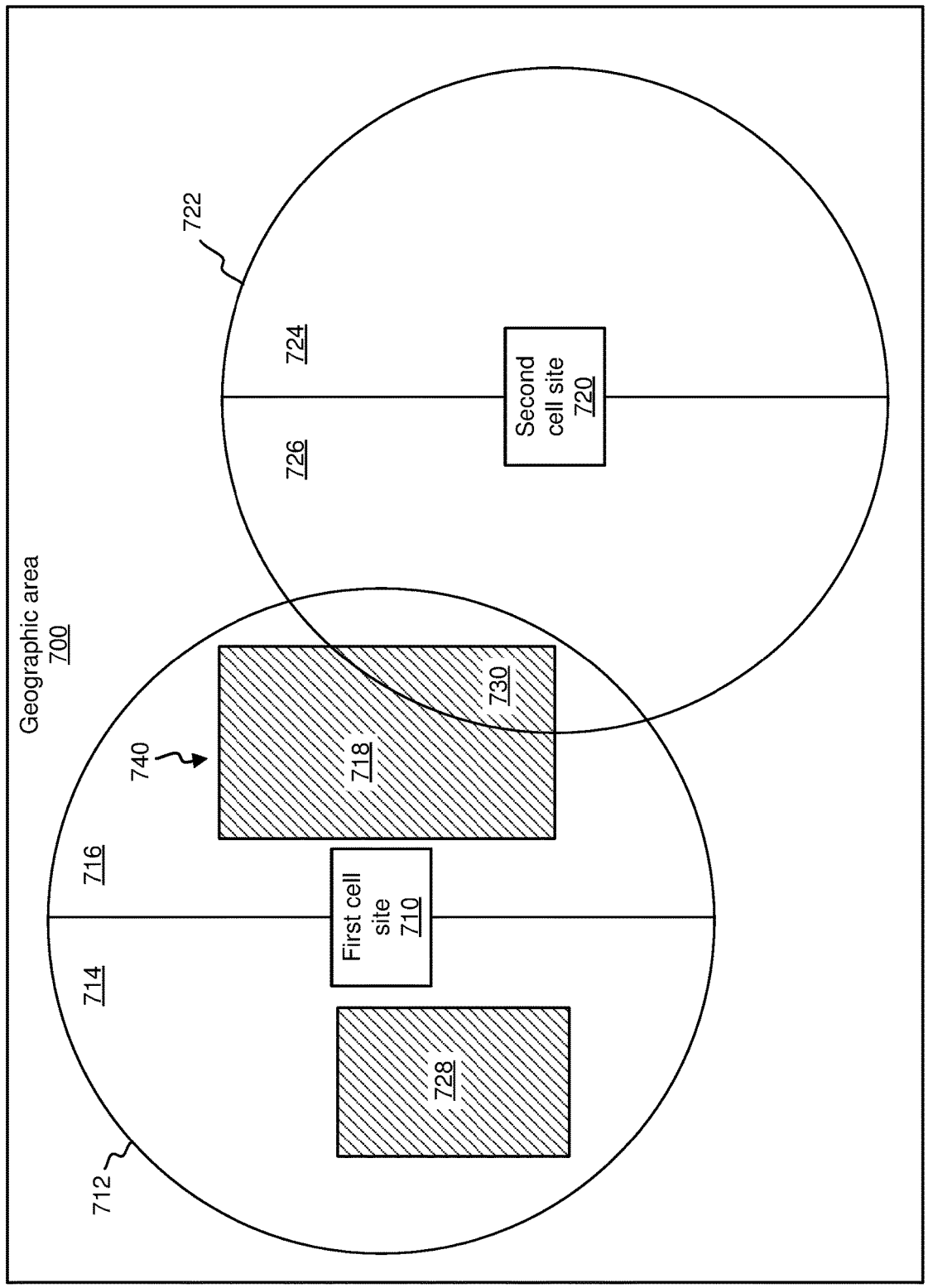
FIG. 7 depicts an example geographic area having first and second cell sites, in accordance with embodiments of the present disclosure.

Referring back to FIG. 4, in operation 410, the call priority system can generate a map of a geographic area that includes one or more cell sites. The map can be generated based on one or more of condition data, telecommunication data, and caller data. Examples of such a map are depicted in FIGS. 6 and 7. In some embodiments, the map can include a visualization, such as those depicted in FIGS. 6 and 7. In some embodiments, the map can include data, such as tabular data, corresponding to condition data, telecommunication data, and/or caller data.

In some embodiments, operation 410 can include the call priority system analyzing obtained condition data, telecommunication data, and/or caller data to determine relative positions of cell sites, coverage regions, and/or focus areas (e.g., areas where emergency conditions may exist). For example, in some embodiments, the call priority system can interpret social media posts and news reports to determine a size and location of one or more flooded sections of a city. Continuing with this example, the call priority system can obtain a location and corresponding coverage region of one or more cell sites in the city. Based on that information, the call priority system can generate a map that includes relative positions and/or sizes of cell sites, coverage regions, and/or focus areas.

In some embodiments, operation 410 can include the call priority system designating a size and/or quantity of subregions of a cell site's coverage region. For example, in some embodiments, the call priority system can designate a fixed number of subregions, such as two or more equally-sized subregions, based on a preestablished setting. Such a preestablished setting can be selected and included in the call priority system by an entity, such as an operator or programmer.

In operation 420, the call priority system can generate subregion weights based on obtained condition data, telecommunication data, and/or caller data. For example, in some embodiments, the call priority system can generate four weights for each subregion: (1) a percentage of detected damage ("Wi"); (2) detected communication devices ("Wj"); (3) a predicted impact of an emergency condition to people in the subregion ("Wk"); and (4) a ratio of a number of calls originating from a subregion to a number of calls originating from the coverage region ("Wl"). In these embodiments, the call priority system can generate such weights by analyzing obtained condition data, telecommunication data, and/or caller data.

For example, in some embodiments, the call priority system can generate a percentage of detected damage (Wi) based on a ratio of the size of one or more focus areas of a subregion to the size of the subregion. For example, a subregion having a size of 10000 square meters ($m^2$) can have a focus area (e.g., an area with floodwater and/or collapsed buildings) having a size of 5000 $m^2$. In this example, the percentage of detected damage (Wi) can be 50%, or 0.50.

In some embodiments, the call priority system can obtain a number of detected communication devices in a subregion from telecommunication data and/or caller data. In some embodiments, detected communication devices (Wj) can correspond to the number of detected communication devices. In some embodiments, Wj can be a ratio of the number of detected communication devices in a subregion to the number of detected communication devices in a coverage region.

In some embodiments, the call priority system can generate a predicted impact of an emergency condition to people in the subregion (Wk). For example, in some embodiments, the call priority system can obtain condition data, such as census data, information about a quantity of buildings in a subregion and/or coverage region, information about occupant capacities of buildings in a subregion and/or coverage region, and news reports, to approximate a number of people in a subregion and a number of people in a coverage region. In this example, the call priority system can calculate Wk as the ratio of the number of people in the subregion to the number of people in the coverage region.

In some embodiments, the call priority system can generate a ratio of a number of calls originating from a subregion to a number of calls originating from the coverage region (Wl). Such a ratio can be based on telecommunication data and/or caller data.

In operation 430, the call priority system can determine a classification for each subregion. In some embodiments, a classification for each subregion can be determined by calculating a sum of the weights generated for each subregion. For example, a classification ("C") for a first subregion can be calculated using the equation: C=Wi+Wj+Wk+Wl. In some embodiments, a classification (C) for a subregion can be selected, based on mathematical relationships, such that the classification is proportional to the sum of weights for the subregion. In this way, a set of classifications corresponding to a coverage region can be selected such that the sum of the set of classifications equals 100%.

Figure 5:
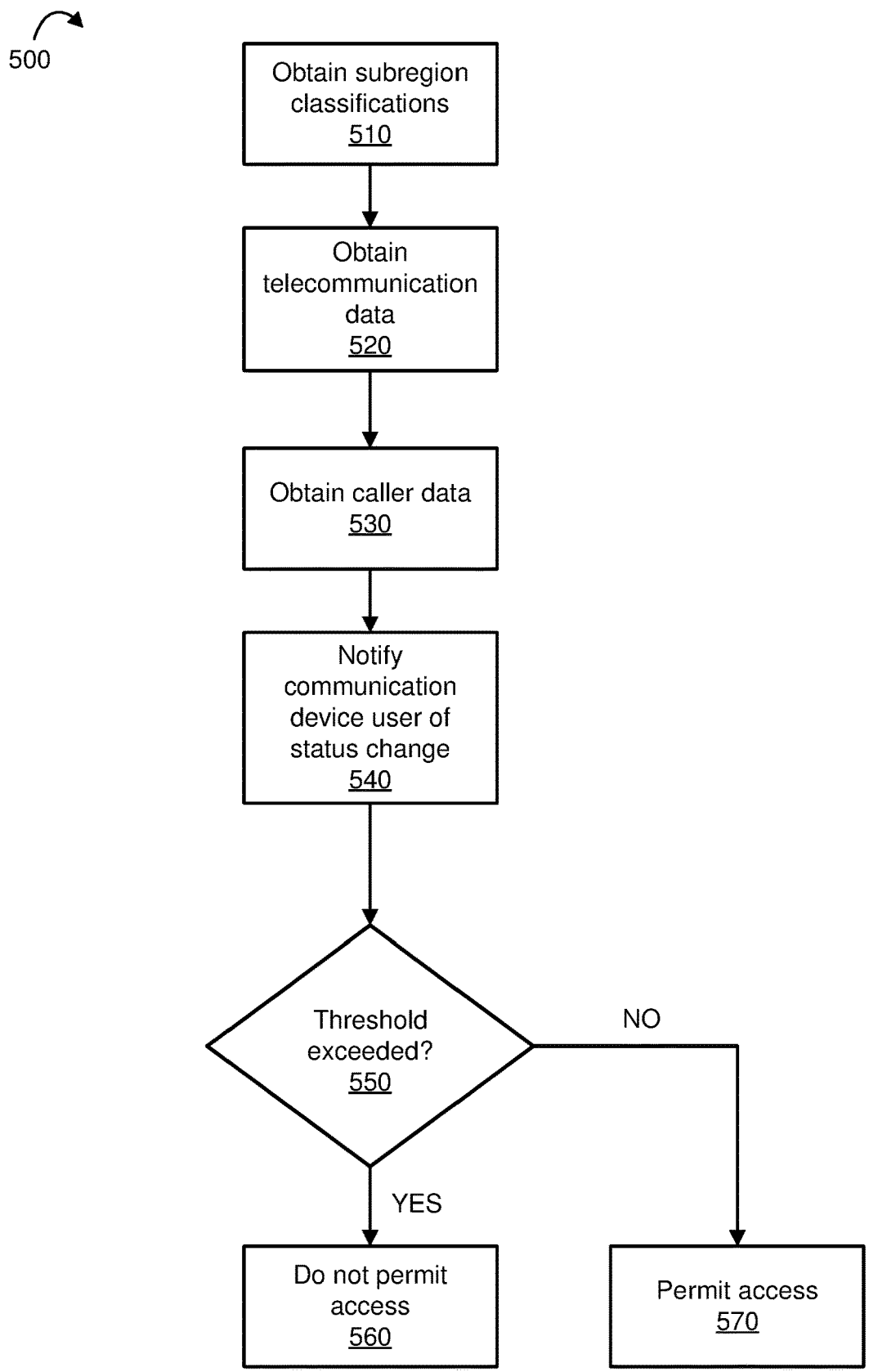
FIG. 5 depicts a flowchart of an example method for permitting access to a telecommunications network, in accordance with embodiments of the present disclosure.

FIG. 5 depicts a flowchart of an example method for permitting access to a telecommunications network, in accordance with embodiments of the present disclosure. Method 500 can be performed by a processor of a call priority system, such as call priority system 240 discussed with respect to FIG. 2.

Referring back to FIG. 5, in operation 510, the call priority system can obtain subregion classifications. In operation 520, the call priority system can obtain telecommunication data. In operation 530, the call priority system can obtain caller data.

In some embodiments, in operation 540, the call priority system can notify a communication device user of a change in communication capacity in the subregion where the communication device user is located. Such a notification can be based on subregion classifications obtained in operation 510, telecommunication data obtained in operation 520, and caller data obtained in operation 530. For example, at a first time, a communication device user in a first subregion may have been unable to access a telecommunications network due to the first subregion having a classification of 5%. At a second time, due to changed conditions, the call priority system can generate an updated classification of 40% for the first subregion. In this example, the call priority system can transmit a notification to communication devices in the first subregion to alert communication device users of an increased communication capacity in the first subregion. Such an alert can facilitate efficient and accurate administration of assistance to communication device users subject to emergency conditions.

In operation 550, the call priority system can determine whether one or more thresholds are exceeded. For example, in some embodiments, the caller data obtained in operation 530 can include historical data indicating that a caller (e.g., a communication device user) has not previously accessed the telecommunications network for a phone call. Continuing with this example, the call priority system can compare the number of times the caller has previously accessed the telecommunications network (i.e., 0) to a predetermined threshold (i.e., 0) and determine that the threshold has not been exceeded. Continuing with this example, the call priority system can proceed to operation 570 and permit the caller to access the telecommunications network. In some embodiments, if the call priority system determines that the threshold is exceeded, the call priority system can proceed to operation 560 and not permit the caller access to the telecommunications network. In this way, the call priority system can limit access to the telecommunications network to callers who have not previously accessed the telecommunications network.

FIG. 6 depicts an example map of a geographic area 600 having a cell site 610, in accordance with embodiments of the present disclosure. FIG. 6 includes a coverage region 670 of the cell site 610. The coverage region 670 is divided into four subregions: a first subregion 620, a second subregion 630, a third subregion 640, and a fourth subregion 650. Within the coverage region 670 are three focus areas where emergency conditions are present. A first focus area 660 includes a first sub-focus area 626 in the first subregion 620 and a second sub-focus area 632 in the second subregion 630. A sub-focus area can refer to a portion of a focus area within a subregion. The second focus area 624 is located in the first subregion 620. The third focus area 642 is located in the third subregion 640.

In an example embodiment, based on the sizes of the focus areas in each subregion, the call priority system can generate a region classification such that the second subregion 630 can obtain a larger portion of the communication capacity of the cell site 610 than the other three subregions to accommodate the larger focus area within the second subregion 630.

In some embodiments, the call priority system can further divide a subregion classification among one or more focus areas and/or sub-focus areas within a subregion. The further-divided subregion classifications can be referred to as sub-classifications for one or more focus areas and/or sub-focus areas. For example, the call priority system can generate a 30% classification for the first subregion 620. Further in this example, the call priority system can further divide the 30% classification such that the second focus area 624 has a 10% sub-classification and the first sub-focus area 626 has a 20% sub-classification.

In some embodiments, the call priority system can generate the sub-classifications such that they are proportional to the sizes of the focus areas and/or sub-focus areas. For example, the call priority system can further divide a subregion classification such that the first sub-focus area 626 has a greater sub-classification than the second focus area 624 because the first sub-focus area 626 has a larger size than the second focus area 624. In some embodiments, the call priority system can generate sub-classifications based on condition data, telecommunication data, and/or caller data. In some embodiments, the call priority system can generate sub-classifications by operations analogous to those discussed with respect to FIGS. 3-5. By generating sub-classifications, the call priority system can further tailor a cell site's communication capacity to accommodate communication device users who likely need greater access to a telecommunications network.

FIG. 7 depicts an example map of a geographic area 700 having a first cell site 710 and second cell site 720, in accordance with embodiments of the present disclosure. FIG. 7 includes a first coverage region 712 of the first cell site 710 and a second coverage region 722 of the second cell site 720. In this example, the first coverage region 712 includes a first subregion 714 and a second subregion 716. The second coverage region 722 includes a third subregion 726 and a fourth subregion 724. FIG. 7 further includes two focus areas: a first focus area 740 and a second focus area 728. In this example, the first sub-focus area 718 is located within the first coverage region 712. Further in this example, the second sub-focus area 730 is located within both the first coverage region 712 and the second coverage region 722. Thus, in this example, the call priority system can obtain condition data, telecommunication data, and/or caller data corresponding to both the first cell site 710 and the second cell site 720. Furthermore, the call priority system can generate region classifications that permit the second cell site 720 to provide telecommunications network access to second sub-focus area 730. In this way, the first cell site 710 can share a larger communication capacity between first sub-focus area 718 and second focus area 728.

For example, in embodiments in which the call priority system does not account for the second coverage region 722, the call priority system can generate a first classification of 60% for the second subregion 716 and a second classification of 40% for the first subregion 714. In this scenario, if the first cell site 710 has a communication capacity of 100 communication devices, then up to 60 communication devices within the second subregion 716 can be permitted to access a telecommunications network using the first cell site 710. Further in this scenario, up to 40 communication devices within the first subregion 714 can be permitted to access a telecommunications network using the first cell site 710.

In contrast, in embodiments in which the call priority system does account for the second coverage region 722, the call priority system can generate a first classification of 50% for the second subregion 716 and a second classification of 50% for the first subregion 714. Thus, in this example, up to 50 communication devices within the second subregion 716 can be permitted to access a telecommunications network using the first cell site 710, and up to 50 communication devices within the first subregion 714 can be permitted to access a telecommunications network using the first cell site 710. Furthermore, if the second cell site 720 has a communication capacity of 100 communication devices, then up to 50 communication devices within the third subregion 726 can be permitted to access a telecommunications network using the second cell site 720. Accordingly, in embodiments in which the call priority system can account for the first coverage region 712 and the second coverage region 722, the call priority system can increase a communication capacity for the first focus area 740 and the second focus area 728.

Figure 8:
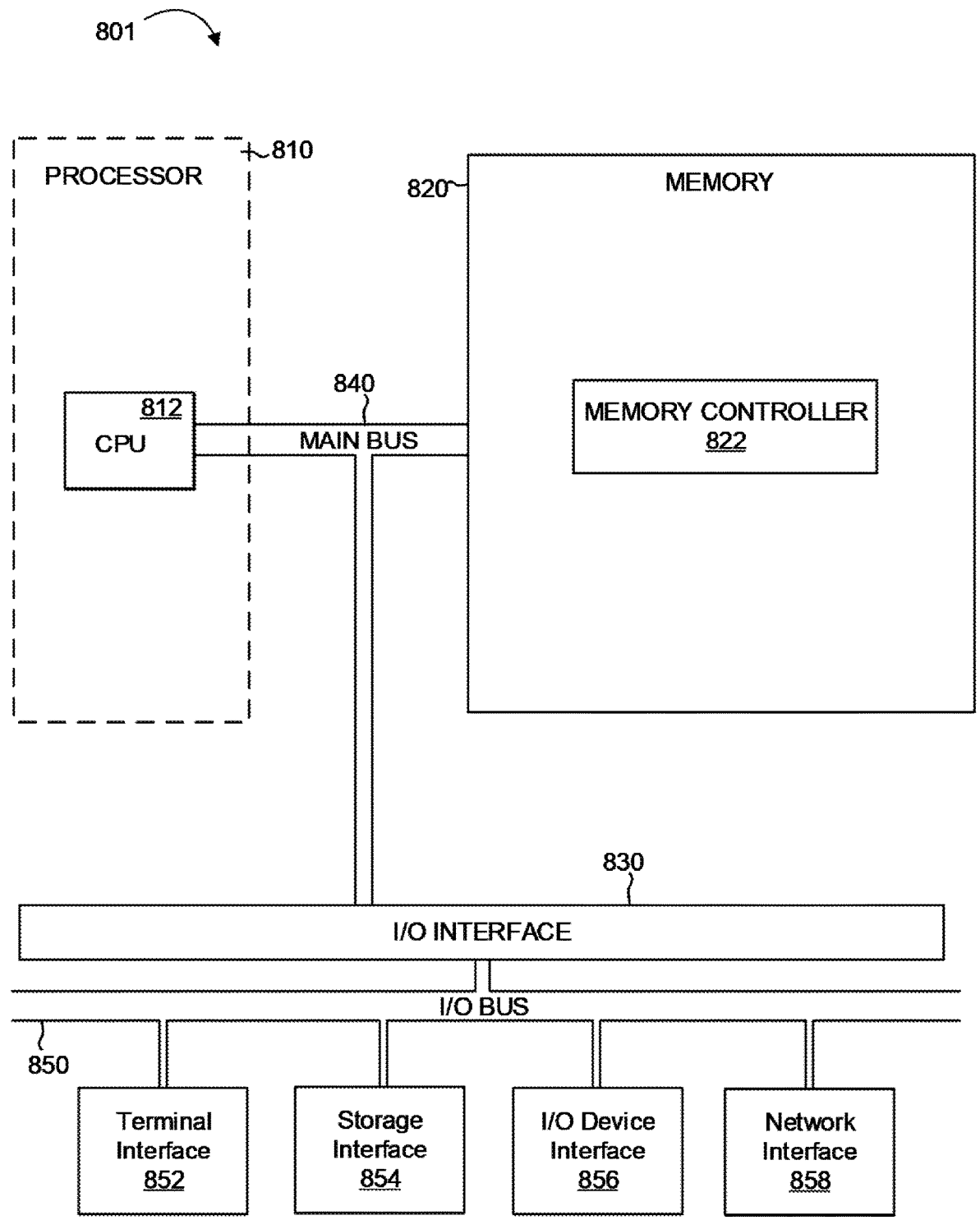
FIG. 8 depicts the representative major components of a computer system that can be used in accordance with embodiments of the present disclosure.

FIG. 8 depicts the representative major components of an exemplary Computer System 801 that can be used in accordance with embodiments of the present disclosure. The particular components depicted are presented for the purpose of example only and are not necessarily the only such variations. The Computer System 801 can comprise a Processor 810, Memory 820, an Input/Output Interface (also referred to herein as I/O or I/O Interface) 830, and a Main Bus 840. The Main Bus 840 can provide communication pathways for the other components of the Computer System 801. In some embodiments, the Main Bus 840 can connect to other components such as a specialized digital signal processor (not depicted).

The Processor 810 of the Computer System 801 can be comprised of one or more CPUs 812. The Processor 810 can additionally be comprised of one or more memory buffers or caches (not depicted) that provide temporary storage of instructions and data for the CPU 812. The CPU 812 can perform instructions on input provided from the caches or from the Memory 820 and output the result to caches or the Memory 820. The CPU 812 can be comprised of one or more circuits configured to perform one or methods consistent with embodiments of the present disclosure. In some embodiments, the Computer System 801 can contain multiple Processors 810 typical of a relatively large system. In other embodiments, however, the Computer System 801 can be a single processor with a singular CPU 812.

The Memory 820 of the Computer System 801 can be comprised of a Memory Controller 822 and one or more memory modules for temporarily or permanently storing data (not depicted). In some embodiments, the Memory 820 can comprise a random-access semiconductor memory, storage device, or storage medium (either volatile or non-volatile) for storing data and programs. The Memory Controller 822 can communicate with the Processor 810, facilitating storage and retrieval of information in the memory modules. The Memory Controller 822 can communicate with the I/O Interface 830, facilitating storage and retrieval of input or output in the memory modules. In some embodiments, the memory modules can be dual in-line memory modules.

The I/O Interface 830 can comprise an I/O Bus 850, a Terminal Interface 852, a Storage Interface 854, an I/O Device Interface 856, and a Network Interface 858. The I/O Interface 830 can connect the Main Bus 840 to the I/O Bus 850. The I/O Interface 830 can direct instructions and data from the Processor 810 and Memory 820 to the various interfaces of the I/O Bus 850. The I/O Interface 830 can also direct instructions and data from the various interfaces of the I/O Bus 850 to the Processor 810 and Memory 820. The various interfaces can comprise the Terminal Interface 852, the Storage Interface 854, the I/O Device Interface 856, and the Network Interface 858. In some embodiments, the various interfaces can comprise a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—can communicate failures and changes to one or more components to a hypervisor or operating system (not depicted). The hypervisor or the operating system can allocate the various resources available in the Computer System 801 and track the location of data in Memory 820 and of processes assigned to various CPUs 812. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
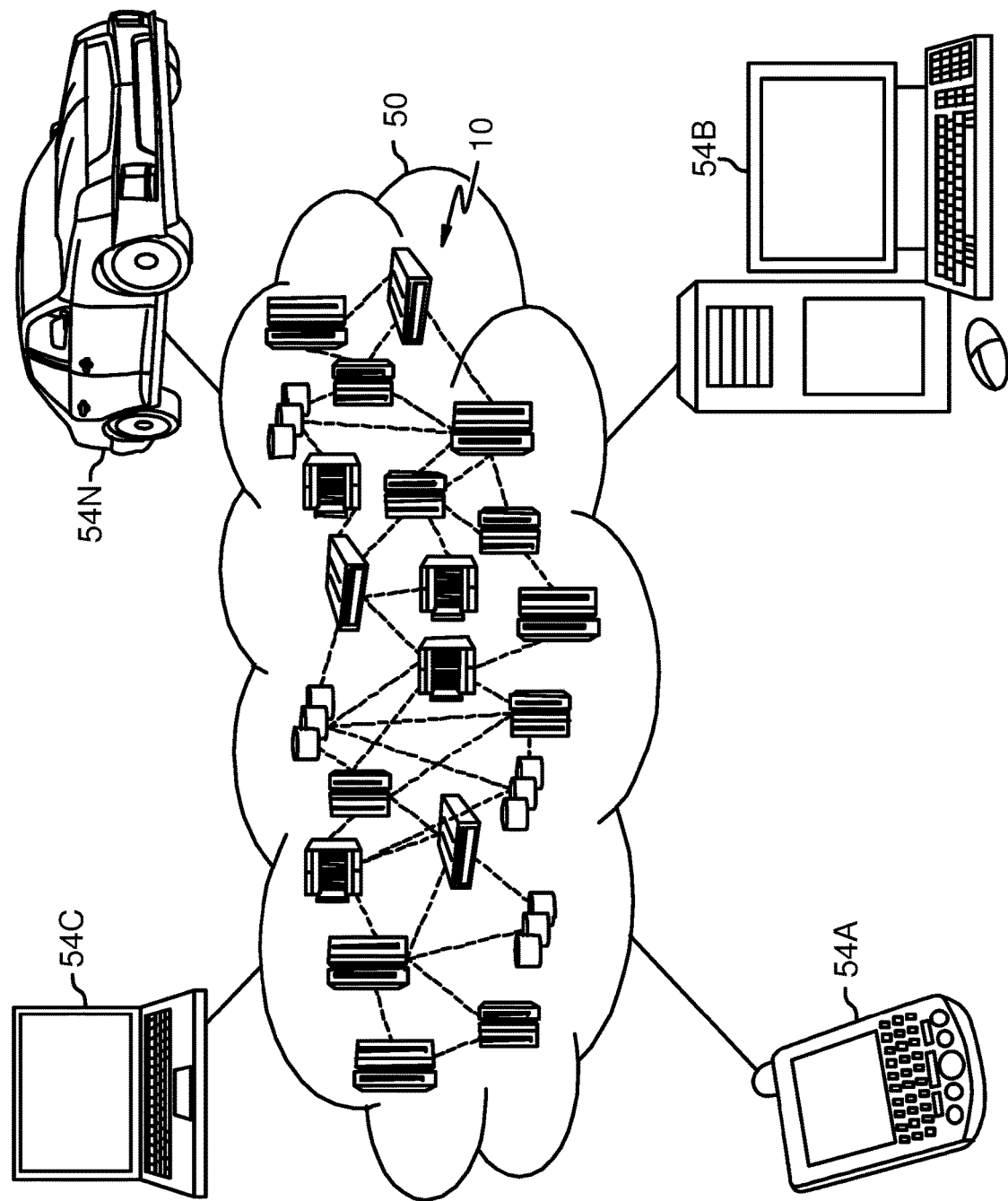
FIG. 9 depicts a cloud computing environment according to embodiments of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
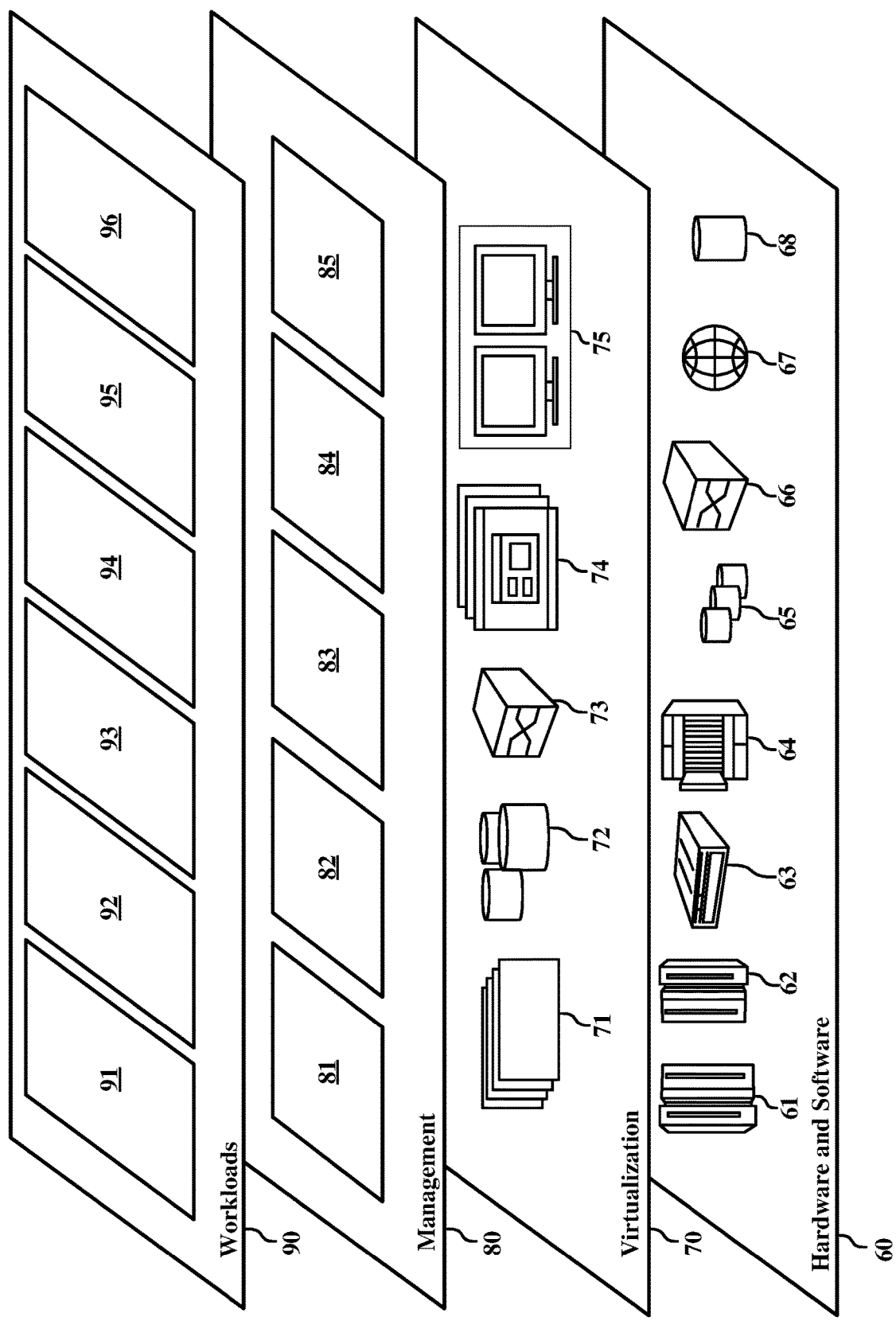
FIG. 10 depicts abstraction model layers according to embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and call priority logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining telecommunication data corresponding to a first cell site, the first cell site having a communication capacity within a first coverage region, the first coverage region comprising a set of subregions;
    obtaining condition data corresponding to a focus area within the first coverage region, the focus area having an emergency condition;
    generating, based on the telecommunication data and the condition data, a first classification for a first subregion of the set of subregions
    wherein the generating the first classification comprises calculating a ratio selected from the group consisting of:
        a first ratio of a number of communication devices in the first subregion to a number of communication devices in the first coverage region, and
        a second ratio of a number of phone calls originating from the first subregion to a number of phone calls originating from the first coverage region; and
    assigning, based on the first classification, a first portion of the communication capacity to the first subregion, the assigning the first portion comprising permitting a first predetermined number of communication devices within the first subregion to access a telecommunications network by the first cell site.

2. The computer-implemented method of claim 1, further comprising:
    obtaining caller data that indicates a number of times a communication device previously accessed the telecommunications network by the first cell site;
    determining that the number of times does not exceed a threshold; and
    permitting, in response to the determining, the communication device to access the telecommunications network by the first cell site.

3. A system comprising:
    a processor; and
    a memory in communication with the processor, the memory containing program instructions that, when executed by the processor, are configured to cause the processor to perform a method, the method comprising:
    obtaining telecommunication data corresponding to a first cell site, the first cell site having a communication capacity within a first coverage region, the first coverage region comprising a set of subregions;
    obtaining condition data corresponding to a focus area within the first coverage region, the focus area having an emergency condition;
    generating, based on the telecommunication data and the condition data, a first classification for a first subregion of the set of subregions,
    wherein the generating the first classification comprises calculating a ratio selected from the group consisting of:
        a first ratio of a number of communication devices in the first subregion to a number of communication devices in the first coverage region, and
        a second ratio of a number of phone calls originating from the first subregion to a number of phone calls originating from the first coverage region; and
    assigning, based on the first classification, a first portion of the communication capacity to the first subregion, the assigning the first portion comprising permitting a first predetermined number of communication devices within the first subregion to access a telecommunications network by the first cell site.

4. The system of claim 3, the method further comprising:
    obtaining caller data that indicates a number of times a communication device previously accessed the telecommunications network by the first cell site;
    determining that the number of times does not exceed a threshold; and
    permitting, in response to the determining, the communication device to access the telecommunications network by the first cell site.

5. A computer program product comprising a computer readable storage medium having program instructions embodied therewith, the program instructions executable by a processor to cause the processor to perform a method, the method comprising:
    obtaining telecommunication data corresponding to a first cell site, the first cell site having a communication capacity within a first coverage region, the first coverage region comprising a set of subregions;
    obtaining condition data corresponding to a focus area within the first coverage region, the focus area having an emergency condition;
    generating, based on the telecommunication data and the condition data, a first classification for a first subregion of the set of subregions,
    wherein the generating the first classification comprises calculating a ratio selected from the group consisting of:
        a first ratio of a number of communication devices in the first subregion to a number of communication devices in the first coverage region, and
        a second ratio of a number of phone calls originating from the first subregion to a number of phone calls originating from the first coverage region; and assigning, based on the first classification, a first portion of the communication capacity to the first subregion, the assigning the first portion comprising permitting a first predetermined number of communication devices within the first subregion to access a telecommunications network by the first cell site.

6. The computer program product of claim 5, the method further comprising:
obtaining caller data that indicates a number of times a communication device previously accessed the telecommunications network by the first cell site;
determining that the number of times does not exceed a threshold; and
permitting, in response to the determining, the communication device to access the telecommunications network by the first cell site.

7. The computer-implemented method of claim 1, further comprising:
generating, based on the telecommunication data and the condition data, a second classification for a second subregion of the set of subregions; and
assigning, based on the second classification, a second portion of the communication capacity to the second subregion, the assigning the second portion comprising permitting a second predetermined number of communication devices within the second subregion to access the telecommunications network by the first cell site.

8. The computer-implemented method of claim 7, wherein the generating the second classification comprises calculating an additional ratio selected from the group consisting of:
a third ratio of a number of communication devices in the second subregion to the number of communication devices in the first coverage region, and
a fourth ratio of a number of phone calls originating from the second subregion to the number of phone calls originating from the first coverage region.

9. The computer-implemented method of claim 1, wherein the generating the first classification further comprises calculating a fifth ratio of a number of people in the first subregion to a number of people in the first coverage region.

10. The computer-implemented method of claim 1, wherein the generating the first classification further comprises calculating a sixth ratio of a size the focus area to a size of the first subregion.

11. The computer-implemented method of claim 1, wherein the generating the first classification is further based on second telecommunication data corresponding to a second cell site having a second communication capacity within a second coverage region, and
wherein a portion of the focus area is within the second coverage region.

12. The system of claim 3, the method further comprising:
generating, based on the telecommunication data and the condition data, a second classification for a second subregion of the set of subregions; and
assigning, based on the second classification, a second portion of the communication capacity to the second subregion, the assigning the second portion comprising permitting a second predetermined number of communication devices within the second subregion to access the telecommunications network by the first cell site.

13. The system of claim 12, wherein the generating the second classification comprises calculating an additional ratio selected from the group consisting of:
a third ratio of a number of communication devices in the second subregion to the number of communication devices in the first coverage region, and
a fourth ratio of a number of phone calls originating from the second subregion to the number of phone calls originating from the first coverage region.

14. The system of claim 3, wherein the generating the first classification further comprises calculating a fifth ratio of a number of people in the first subregion to a number of people in the first coverage region.

15. The system of claim 3, wherein the generating the first classification further comprises calculating a sixth ratio of a size the focus area to a size of the first subregion.

16. The system of claim 3, wherein the generating the first classification is further based on second telecommunication data corresponding to a second cell site having a second communication capacity within a second coverage region, and
wherein a portion of the focus area is within the second coverage region.

17. The computer program product of claim 5, the method further comprising:
generating, based on the telecommunication data and the condition data, a second classification for a second subregion of the set of subregions; and
assigning, based on the second classification, a second portion of the communication capacity to the second subregion, the assigning the second portion comprising permitting a second predetermined number of communication devices within the second subregion to access the telecommunications network by the first cell site.

18. The computer program product of claim 17, wherein the generating the second classification comprises calculating an additional ratio selected from the group consisting of:
a third ratio of a number of communication devices in the second subregion to the number of communication devices in the first coverage region, and
a fourth ratio of a number of phone calls originating from the second subregion to the number of phone calls originating from the first coverage region.

* * * * *